Nov. 23, 1965     H. KÜPPENBENDER     3,218,948
VIEWFINDER-RANGEFINDER DEVICE FOR MIRROR REFLEX
CAMERAS, PARTICULARLY FOR MOTION
PICTURE CAMERAS
Filed July 18, 1962     2 Sheets-Sheet 1

INVENTOR.
Heinz Küppenbender
BY Singer, Stern & Carlberg
Attorneys

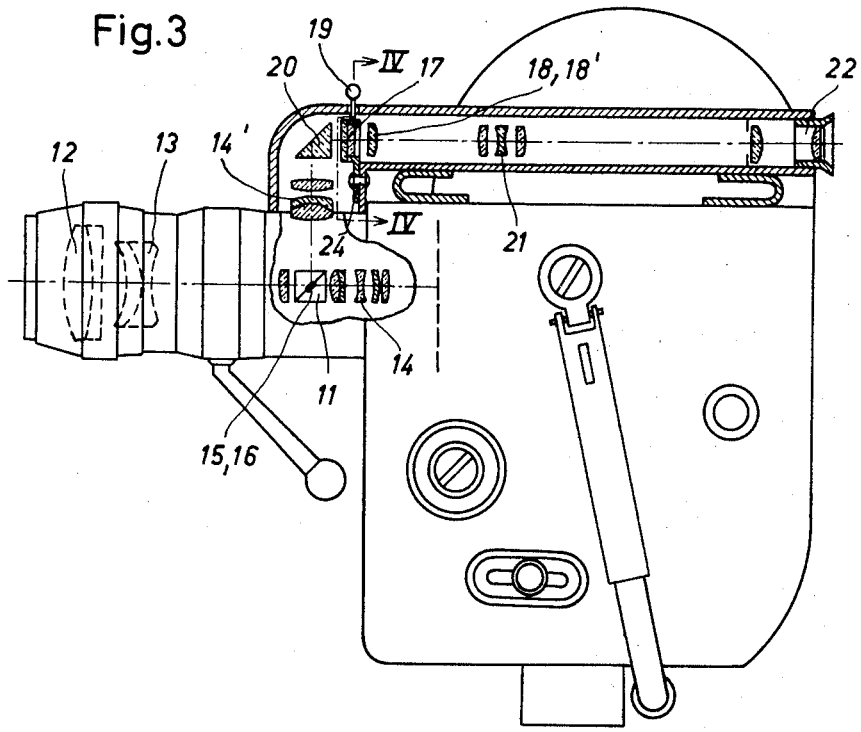
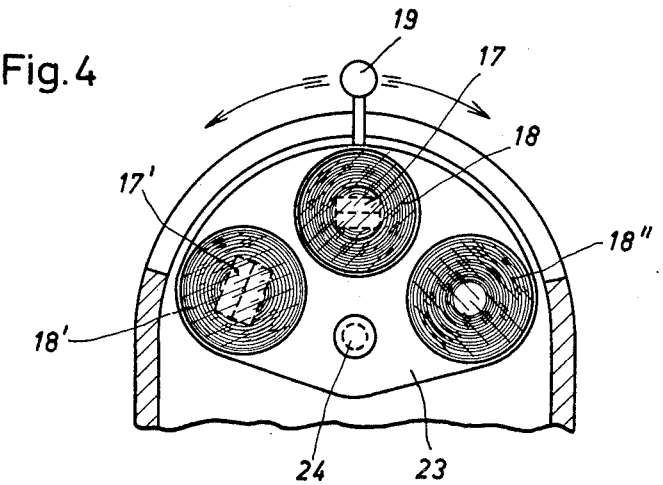

3,218,948
VIEWFINDER-RANGEFINDER DEVICE FOR MIRROR REFLEX CAMERAS, PARTICULARLY FOR MOTION PICTURE CAMERAS

Heinz Küppenbender, Heidenheim, Wurttemberg, Germany, assignor to Carl Zeiss-Stiftung, Heidenheim (Brenz), Germany, a corporation of Germany
Filed July 18, 1962, Ser. No. 210,744
Claims priority, application Germany, Aug. 4, 1961, Z 7,384
4 Claims. (Cl. 95—44)

This invention relates to a viewfinder-rangefinder device for a mirror reflex camera and is particularly concerned with the novel construction of the rangefinder means within this combined viewfinder-rangefinder.

There are viewfinder-rangefinder devices known in which the viewing area looked at by the photographer through a common window is provided in its center with a small measuring field in which the distance measurement is made visible according to the coincidence principle. Mirror reflex cameras have been found especially suitable for such a combined viewfinder-rangefinder device in that a so-called sharpness indicator is arranged in the real viewfinder image plane, which indicator may consist, for instance, of two oppositely oriented wedges. However, in this indicator the boundary lines tend to interfere with the lines present in the object to be photographed and with the lines of the image section to be selected. While up to this time it was believed that a photographer had to tolerate this disturbance in favor of a quick readiness of the camera for picture taking, since the operation of a camera naturally is greatly simplified by one look through a common window for simultaneously focusing the image area and the distance in comparison with a separate viewfinder and rangefinder, the invention endeavors to provide a remedy for the mentioned defect.

It is an object of the invention to overcome the disadvantage described in the foregoing by constructing the means for measuring the distance in such a manner that they may be moved into and out of the ray path of the viewfinder. The user of the camera therefore is able, upon selection of the desired image area, to move the sharpness indicator into the viewfinder area, to adjust or rectify the sharpness, and then to retract the indicator from the viewfinder area so that at the moment of the camera release his judgment of the image will not be disturbed by the rangefinder means. Of extraordinary advantage is this novel arrangement in motion picture cameras, particularly in cameras provided with an objective of variable focal length, when the photographer's attention usually is entirely taken up by his observation of the image. Yet the movable sharpness indicator permits the photographer at any time to make a quick check as to whether a fresh focussing is necessary, for instance in mobile scenes where the objects to be photographed may close in on the camera.

It is another object of the invention to provide a rotatably mounted device by means of which sharpness indicators of different types and sizes and/or of different measuring accuracy may be used.

The focussing by means of a sharpness indicator consisting of a pair of oppositely oriented wedges is the more exact, the larger the distance of the partial pupils is which are united in the common exit pupil by the wedge pair. The englargement of the wedge deflection is, however limited by the opening proportion of the objective which generates the image in the viewfinder plane. In order to assure in all cases a satisfactory illumination of the sharpness indicator, it was heretofore necessary—particularly in cameras provided with exchangeable objectives—to take the objective having the smallest initial opening into consideration and to do with a sharpness indicator in which the wedge deflection is relatively small and therefore the measuring accuracy not too good. This condition is remedied by the present invention in that it provides the possibility to pick from a selection of various sharpness indicators the one whose angle of deviation is best suited for the aperture of the objective.

It is a further object of the invention to provide the retractable or pivotally mounted sharpness indicators with field lenses, preferably with Fresnel lenses of different power of refraction, so that with the adjustment of the sharpness indicator to the aperture of the photographic objective at the same time also an adjustment of the power of refraction of the field lens with respect to the position of the exit pupil of the finder objective will take place as a prerequisite for a uniform illumination of the entire viewing area.

Finally, it is the object of the invention to prevent dust from settling on the optical faces of the sharpness indicator, which surfaces coincide with a real image plane so that any dust thereon would be detrimental to a clear image impression. Particularly in motion picture cameras it is inevitable that dust penetrating through the picture window and other openings into the interior of the camera is constantly whirled up by the fast moving mechanism and naturally also settles on those optical surfaces which coincide with a real image plane where, as mentioned before, any accumulation of dust is indeed very disturbing. Therefore, according to the invention, the sharpness indicator is provided with an additional optical part, such as a field lens or a plane glass plate, in such a manner that the optical surfaces of the wedge indicator which coincide with a real image plane are located within a sealed small cell into which no dust is able to penetrate.

In the following the invention will be described in detail with reference to the accompanying drawings, in which:

FIG. 3 is a side elevation view and partial sectional view of a motion picture camera provided with a rotatable carrier for selectively moving different rangefinder and viewfinder elements into operative position, and FIG. 4 is a sectional view along the line IV—IV of FIG. 3.

Figure 1:
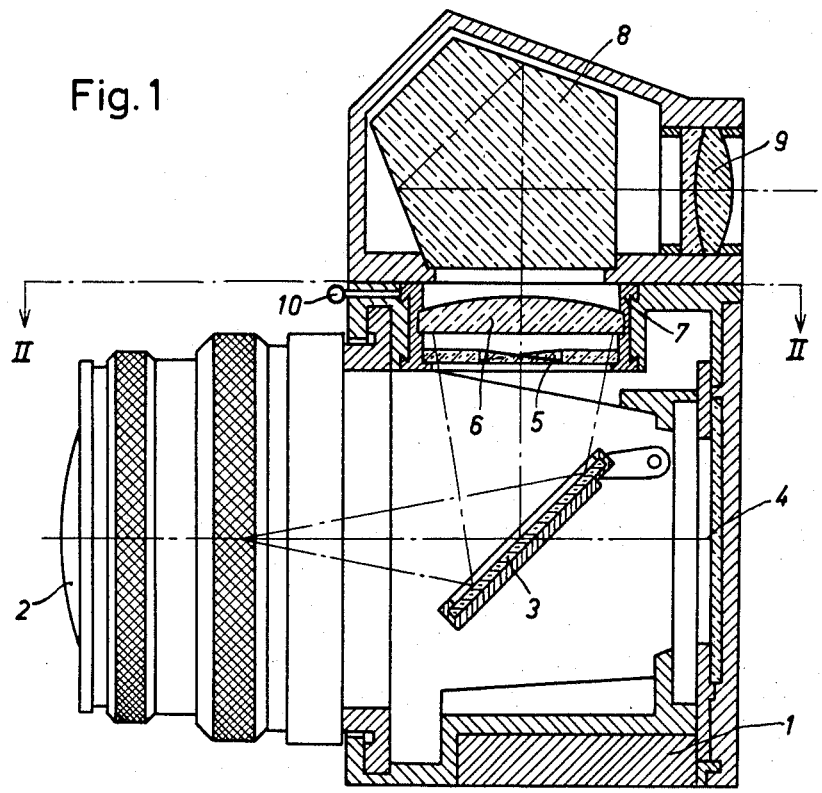
FIG. 1 illustrates in a side elevation view and in a partial sectional view a mirror reflex camera provided with a slide carrying certain rangefinder and viewfinder elements which may be selectively moved into operative position.
Figure 2:
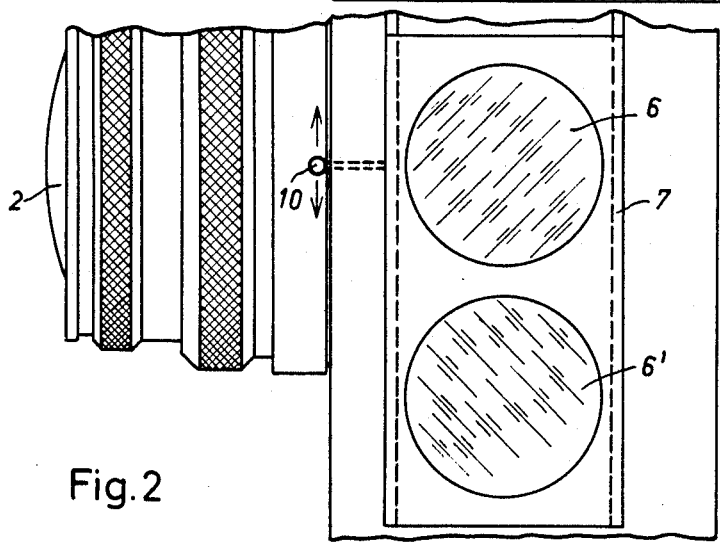
FIG. 2 is a horizontal sectional view along the line II—II of FIG. 1.

Referring to the FIGS. 1 and 2, a camera casing 1 of a mirror reflex camera is provided on its front wall with a photographic objective 2. A tiltable mirror 3 is moved away at the moment of the exposure and permits the light beams to expose a film positioned in the image plane 4. The viewfinder-rangefinder device which is arranged on the top of the casing contains in addition to the tiltable mirror 3 a sharpness indicator 5 consisting of two oppositely oriented wedges. This sharpness indicator 5 together with a field lens 6 is arranged in a horizontally movable slide 7 and both elements 5 and 6 may be moved simultaneously out of the viewfinder area and may be laterally displaced so that a single second field lens 6' takes the place of the sharpness indicator 5 and the field lens 6. The finder device is further provided with an inverting prism 8 and an ocular 9. The slide 7 is operated by an outwardly extending knob 10. As is shown in FIG. 1, the optical surfaces of the sharpness indicator 5 are located in the interior of a closed cell formed by the sharpness indicator 5, the field lens 6 and the frame of the slide 7 so that the optical surfaces of the wedge indicator 5 which coincide with the real viewfinder image are protected against dust.

The FIGS. 3 and 4 illustrate schematically a motion picture camera which is adapted to selectively receive in its viewfinder path two sharpness indicators of a different type and measuring accuracy.

The viewfinder receives the light beam from a dividing cube 11 arranged in the path of a pancratic photographic objective which consists of a front lens systems 12, a middle lens system 13 and a rear lens systems 14. Two small reflector surfaces 15 and 16 are arranged in the diagonal surface of the dividing cube 11 and are positioned vertically one after the other with respect to the plane of the drawing. The position of these reflector surfaces 15 and 16 is so selected that by the effect of an indicator plate 17 in rear of the surfaces 15, 16 their images will be projected into the common exit pupil of the viewfinder-rangefinder device, while all other portions of the diagonal surface of the dividing cube 11 are completely transparent so that in the optical path of the photographic objective only a slight weakening of the light beam will take place. The invention provides now two indicator plates 17 and 17′ which together with their associated field lenses 18, 18′, which may consist of Fresnel lenses, may be selectively introduced into the viewfinder ray path by operating a lever having a knob 19. In similar manner as in FIG. 1, the sharpness indicator plates 17 and 17′, respectively, are expediently mounted with the field lenses 18 and 18′, respectively, in a single mount in such a manner that the optical surfaces of the sharpness indicator which coincide with a real image plane are protected against dust. Furthermore, in place of one of the different indicator plates there may be used only a field lens 18″ without an indicator plate. In that case the field lens 18″ is arranged with a plane glass plate or a simple glass wedge in a single mount in such a manner that the glass surface or wedge surface, respectively, which coincides with a real image plane, again is positioned in the interior of a dust proof cell. The rear lens system of the finder is designated with 14′ and projects a sharp image of the photographic object into the coincidence plane of the wedge arrangement 17 and 17′, respectively, which image in turn may be viewed in the ocular image plane of the ocular 22 after it was deflected by a prism 20 and an inversion system 21. The indicator plates 17 and 17′ with their field lenses 18 and 18′, resp. and the field lens 18″ are mounted in a rotatable disc 23 about the axis 24 and the rotatable adjustment takes place by means of the lever 19.

What I claim is:
1. The combination with a mirror reflex camera, of a viewfinder-rangefinder device having a single ocular for observing the viewfinder area and a removable sharpness indicator of the coincidence type arranged in said viewfinder area, and means including a manually operable carrier in which said sharpness indicator is mounted, said carrier being movably mounted in said camera for selectively inserting into and removing from the viewfinder light path said sharpness indicator, said means moving the carrier to a position in which the sharpness indicator is removed from the viewfinder light path and the entire viewfinder image area is unobstructed by any sharpness indicator.

2. The combination with a mirror reflex camera, of a viewfinder-rangefinder device having a single ocular for observing the viewfinder area and any one of two optically different sharpness indicators of the coincidence type adapted to be arranged in said viewfinder area, and means including a manually operable carrier in which said two sharpness indicators are mounted, said carrier being movably mounted in said camera for selectively inserting into and removing from the viewfinder light path any one of said two sharpness indicators, whereby in a third position in which both of said sharpness indicators are removed from the viewfinder light path the entire viewfinder image area is unobstructed.

3. The combination with a mirror reflex camera, of a viewfinder-rangefinder device having a single ocular for observing the viewfinder area and a removable sharpness indicator of the coincidence type arranged in said viewfinder area, means including a manually operable carrier in which said sharpness indicator is mounted, said carrier being movably mounted in said camera for selectively inserting into and removing from the viewfinder light path said sharpness indicator, said means moving the carrier to a position in which the sharpness indicator is removed from the viewfinder light path and the entire viewfinder image area is unobstructed by any sharpness indicator, and an image field lens arranged in axial alignment with said sharpness indicator in said carrier and movable therewith.

4. The combination with a mirror reflex camera, of a viewfinder-rangefinder device having a single ocular for observing the viewfinder area and any one of two optically different sharpness indicators of the coincidence type adapted to be arranged in said viewfinder area, means including a manually operable carrier in which said two sharpness indicators are mounted, said carrier being movably mounted in said camera for selectively inserting into and removing from the viewfinder light path any one of said two sharpness indicators, whereby in a third position in which both of said sharpness indicators are removed from the viewfinder light path the entire viewfinder image area is unobstructed, and an image field lens in the form of a Fresnel lens arranged in axial alignment with each one of said two sharpness indicators in said carrier and movable therewith.

References Cited by the Examiner
UNITED STATES PATENTS

| 2,969,706 | 1/1961 | Rosier | 95—44 X |
| 2,986,599 | 5/1961 | Lindner | 95—44 X |
| 3,062,086 | 11/1962 | Papke | 88—1.5 |

FOREIGN PATENTS

| 1,107,591 | 8/1955 | France. | |

JOHN M. HORAN, *Primary Examiner.*

NORTON ANSHER, *Examiner.*